US011734999B2

(12) United States Patent
Restivo et al.

(10) Patent No.: US 11,734,999 B2
(45) Date of Patent: *Aug. 22, 2023

(54) SECURE BET SYNCHRONIZATION AND BETTING ANALYTICS (71) Applicant: The Action Network, Inc., New York, NY (US)

(72) Inventors: Matthew Restivo, Long Island City, NY (US); Kevin Cassata, Verona, WI (US); Justyn Laufenberg, Stoughton, WI (US)

(73) Assignee: THE ACTION NETWORK, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,298

(22) Filed: Nov. 19, 2021

(65) Prior Publication Data
US 2022/0076523 A1 Mar. 10, 2022

Related U.S. Application Data (63) Continuation of application No. 16/845,973, filed on Apr. 10, 2020, now Pat. No. 11,183,010.
(Continued)

(51) Int. Cl.
*G07F 17/32* (2006.01)
*G06F 16/27* (2019.01)
(Continued)

(52) U.S. Cl.
CPC .............. *G07F 17/323* (2013.01); *G06F 9/54* (2013.01); *G06F 16/27* (2019.01);
(Continued)

(58) Field of Classification Search
USPC .......................................................... 463/25
See application file for complete search history.

(56) References Cited

U.S. PATENT DOCUMENTS 7,428,750 B1   9/2008 Dunn et al.
8,775,316 B2   7/2014 Wilson et al.
(Continued)

FOREIGN PATENT DOCUMENTS

WO   2007118300 A1   10/2007
WO   2016095015 A1   6/2016

OTHER PUBLICATIONS

Panagiotis Papadopoulos et al., "Cookie Synchronization: Everything You Always Wanted to Know But Were Afraid to Ask", ACM, 2019.

(Continued)

*Primary Examiner* — Pierre E Elisca
(74) *Attorney, Agent, or Firm* — Venable LLP; Ryan T. Ward (57) ABSTRACT Bet synchronization, to provide a user with at least information about bets made by the user at multiple sportsbooks, may be performed by a server. The server may permit the user to register and login and to provide information on sportsbooks with which the user bets. The server may generate a shared session key and provide this to the sportsbooks indirectly, via direct links to the sportsbooks provided to the user. The user may use the links to login to the respective sportsbooks, which may then generate respective unique reference identification keys, which may then be indirectly provided to the server via redirects including the shared session key and the respective unique reference identification keys. The server may then use the shared session key and the respective unique reference identification keys to transmit requests to the respective sportsbooks and to obtain bet information associated with the user.

20 Claims, 11 Drawing Sheets

Related U.S. Application Data (60) Provisional application No. 62/832,045, filed on Apr. 10, 2019.

(51) Int. Cl.
  *G06F 16/9535*    (2019.01)
  *G06F 16/9538*    (2019.01)
  *H04L 9/08*      (2006.01)
  *G06Q 50/34*     (2012.01)
  *G06F 9/54*      (2006.01)

(52) U.S. Cl.
  CPC ...... *G06F 16/9535* (2019.01); *G06F 16/9538* (2019.01); *G06Q 50/34* (2013.01); *G07F 17/3211* (2013.01); *G07F 17/3288* (2013.01); *H04L 9/0866* (2013.01)

(56) References Cited

U.S. PATENT DOCUMENTS

| | | |
|---|---|---|
| 8,843,415 B2 | 9/2014 | Karabulut et al. |
| 10,916,103 B2 * | 2/2021 | Shore .................. G07F 17/3241 |
| 2013/0196754 A1 | 8/2013 | Burns |
| 2017/0018145 A1 * | 1/2017 | Shore .................. G07F 17/3211 |
| 2017/0161987 A1 * | 6/2017 | Bulzacki ............. G07F 17/3248 |
| 2018/0247134 A1 * | 8/2018 | Bulzacki ............. G06V 10/774 |
| 2018/0365788 A1 | 12/2018 | Said et al. |
| 2019/0035210 A1 * | 1/2019 | Bulzacki ................ G06F 18/10 |
| 2019/0318573 A1 | 10/2019 | DiGiovanni |
| 2019/0333321 A1 * | 10/2019 | Bulzacki ............. G07F 17/3241 |
| 2020/0157114 A1 | 5/2020 | Kamioka et al. |
| 2020/0184776 A1 * | 6/2020 | Higgins ............. G07F 17/3288 |
| 2020/0184777 A1 * | 6/2020 | Higgins ............. G07F 17/3288 |
| 2020/0202134 A1 * | 6/2020 | Bulzacki ................ G06V 10/56 |
| 2021/0110670 A1 * | 4/2021 | Berlec .................. A63F 5/0005 |
| 2021/0256650 A1 | 8/2021 | Huke et al. |

OTHER PUBLICATIONS

Office Action dated Mar. 7, 2023 in corresponding U.S. Appl. No. 17/659,414.

* cited by examiner

| Sportsbook | Bet | Odds/Line | Event Date | Outcome |
|---|---|---|---|---|
| Joe's Gaming | 4th Race-Uppsand Downs-PizzaMan to Win | 9:1 | July 11, 2018 | Loss |
| Joe's Gaming | Ants at Anteaters: Anteaters | Anteaters -5 | August 8, 2018 | Win |
| Jane's Casino | Shirts at Skins – Over | Over/Under 160 | September 25, 2018 | Win |
| Jane's Casino | Egbert Jones of Sparrows to Get Three Hits | 90:1 | September 28, 2019 | Pending |
| Jane's Casino | J.P.G. Ringo to win Furd Open | 15:1 | October 9, 2019 | Pending |

FIG. 7

User Entity Display

Success Rates and Recommendations

| Type of Bet | Success Rate | Recommended? |
|---|---|---|
| Pro Football – Against Spread | 54% | Y |
| Pro Football – With Spread | 40% | N |
| Men's College Basketball – Over/Under | 62% | Y |
| Horse Racing – Win | 22% | N |
| Women's Golf – Tournament Winner | 9% | N |
| Women's College Basketball – With Spread | 69% | Y |
| Women's College Basketball – Against Spread | 36% | N |

SECURE BET SYNCHRONIZATION AND BETTING ANALYTICS

CROSS-REFERENCE TO RELATED APPLICATIONS

This application is a continuation of U.S. patent application Ser. No. 16/845,973, filed on Apr. 10, 2020, which claims priority benefit to U.S. Provisional App. No. 62/832,045 filed on Apr. 10, 2019, the contents of which are incorporated herein by reference in its entirety.

FIELD

The present application relates generally to systems and methods for data collection and analytics, and in particular to systems and methods for synchronizing a user's bets and/or performing analytics based thereupon.

BACKGROUND

In the sports gambling world, people place bets with bookmakers and/or other gambling establishments (e.g., casinos, racetracks, etc.). People often make bets with more than one such bookmaker or gambling establishment and thus must track their bets separately with each bookmaker or gambling establishment.

Additionally, many people make bets without any thought as to what types of bets might be better for them to pursue, based on their own historical success. Such historical success may indicate a person's insight into certain types of betting.

SUMMARY

A system, method and computer-program product is disclosed for the purpose of enabling an individual user to track its bets, present and/or historical, in one place, e.g., in a mobile application or at a single website. In the case of a person's betting history, data analysis may be applied to seek or identify trends, such as success rates, and recommendations may be provided regarding future betting. Success rates, which may be in the form of win probabilities, associated with particular types of bets and/or for all types of bets, may be provided.

This may eliminate the need for a user to separately track bets made with various bookmakers or gambling establishments and also may provide guidance to the user regarding future betting activities.

A method of bet synchronization is disclosed, where the method comprises enabling a user to access a server; obtaining, by the server, information of a sportsbook from the user; generating a shared session key by the server; incorporating the shared session key into a link to the sportsbook and forwarding the link to the user, wherein the link enables the user to login to the sportsbook; receiving, at the server, via a user redirect to the server from the sportsbook, a unique reference identification key generated by the sportsbook, wherein the unique reference identification key is associated with the user; transmitting, by the server, a request to the sportsbook for betting information associated with the user, wherein the request uses the shared session key and the unique reference identification key; and receiving the betting information associated with the user from the sportsbook A server apparatus to facilitate bet synchronization is disclosed, where the server apparatus comprises one or more processors; non-transitory memory communicatively coupled to the one or more processors; and a communication system coupled to the one or more processors, wherein the non-transitory memory contains instructions configured to cause the one or more processors of the server apparatus to perform operations including: enabling a user to access, via the communication system, the server apparatus; obtaining from the user, via the communication system, information of a sportsbook; generating a shared session key; incorporating the shared session key into a link to the sportsbook and using the communication system to forward the link to the user, wherein the link enables the user to login to the sportsbook; receiving, via a user redirect to the server apparatus from the sportsbook, a unique reference identification key generated by the sportsbook, wherein the unique reference identification key is associated with the user; transmitting, via the communication subsystem, a request to the sportsbook for betting information associated with the user, wherein the request uses the shared session key and the unique reference identification key; and receiving the betting information associated with the user from the sportsbook.

A non-transitory computer-readable medium containing executable code designed to implement operations to facilitate bet synchronization is disclosed, where the operations comprises enabling a user to access a server; obtaining, by the server, information of a sportsbook from the user; generating a shared session key by the server; incorporating the shared session key into a link to the sportsbook and forwarding the link to the user, wherein the link enables the user to login to the sportsbook; receiving, at the server, via a user redirect to the server from the sportsbook, a unique reference identification key generated by the sportsbook, wherein the unique reference identification key is associated with the user; transmitting, by the server, a request to the sportsbook for betting information associated with the user, wherein the request uses the shared session key and the unique reference identification key; and receiving the betting information associated with the user from the sportsbook

BRIEF DESCRIPTION OF THE DRAWINGS

The accompanying drawings, which are included to provide a further understanding of the embodiment and are incorporated in and constitute a part of this specification, illustrate embodiments of the disclosed device and together with the detailed description serve to explain the principles of the embodiment. In the drawings.

DETAILED DESCRIPTION

Figure 1:
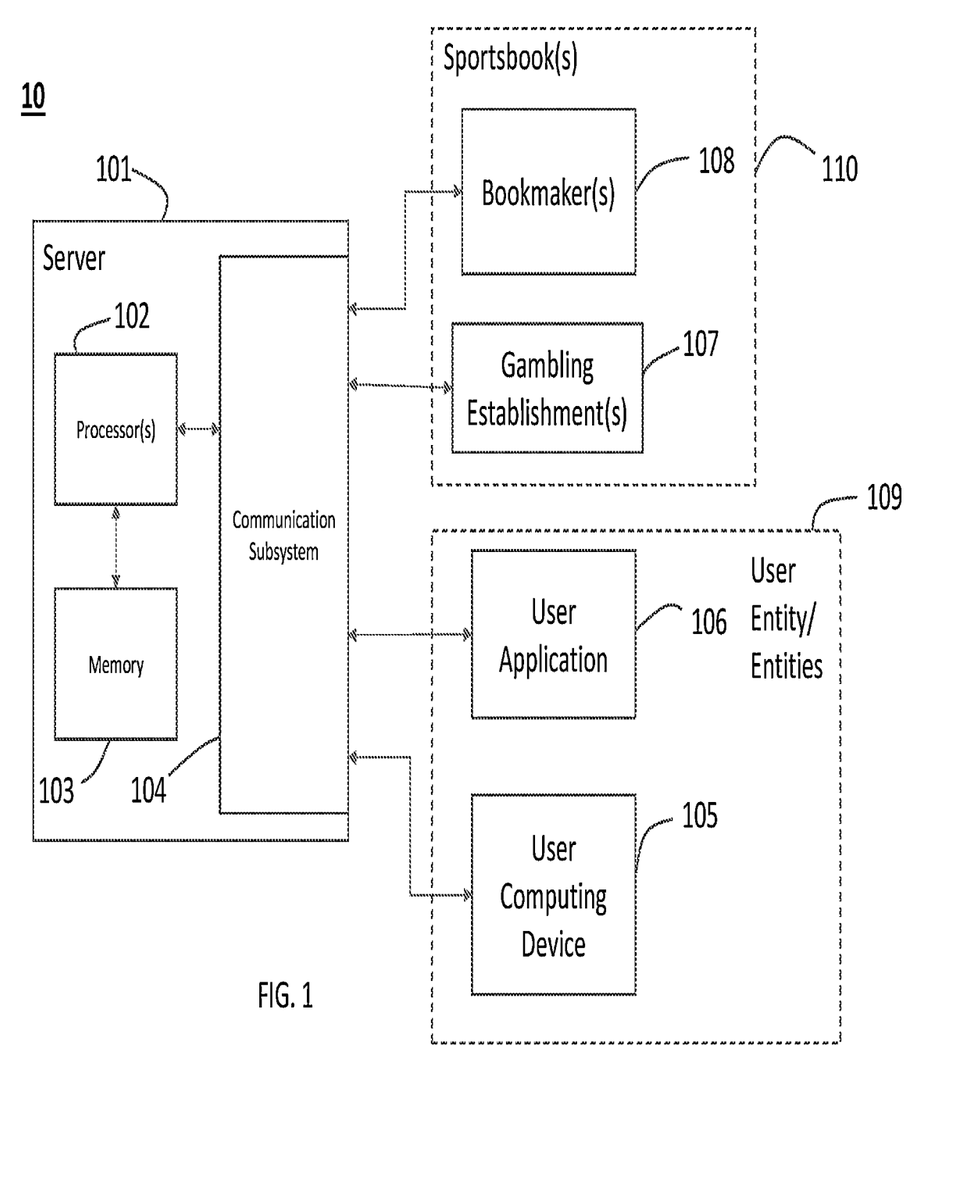
FIG. 1 illustrates a conceptual system view according to an embodiment.

Turning first to FIG. 1, a conceptual representation of a system is disclosed according to an embodiment. The system may include a server 101, which may contain one or more processors 102. Processor(s) 102 may be communicatively coupled with memory 103, which may comprise more than one memory unit (and which memory units are thus being collectively referred to herein as memory 103). Memory 103 may be non-transitory and may store instructions that may cause processor(s) 102 to execute various operations according to aspects of the present disclosure. Server 101 may further include a communication subsystem 104, which may be communicatively coupled to processor(s) 102, and which may enable server 101 to communicate with various external entities 105-108 via one or more communication media (e.g., radio, optical fiber, telephone, wire, etc., which may include one or more communication networks, which may further include the Internet). As such, communication subsystem 104 may include various baseband and communication media-related (e.g., radio frequency (RF), optical, etc.) components as may be needed to support communication over the various communication media. Such components may include one or more modems, amplifiers, filters, antennas, network interfaces and/or other components. The external entities may include user entities 109, such as, for example, one or more computing devices 105 (e.g., accessing a website on the Internet) and/or one or more user applications 106 (e.g., an application running on a smartphone, tablet computer, personal computer, etc.). User entities 109 may further included processors and data storage devices, e.g., memory, as well as communication components that enable them to communicate with server 101 (at a minimum). The external entities may further sportsbooks 110, such as, for example, one or a plurality of bookmakers 107 and/or other gambling establishments 108 (e.g., but not limited to, casinos, racetracks, etc.). Sportsbooks 110, such as the bookmakers 107 and/or other gambling establishments 108 may include computing devices, memory and communication components that may, as a minimum, enable sportsbooks 110 to communicate with server 101. Additionally, sportsbooks 110 may be enabled to communicate with user entities 109. For example, the sportsbooks 110 may directly communicate with the user entities 109 or may communicate indirectly with the user entities via the server 101.

Figure 2:
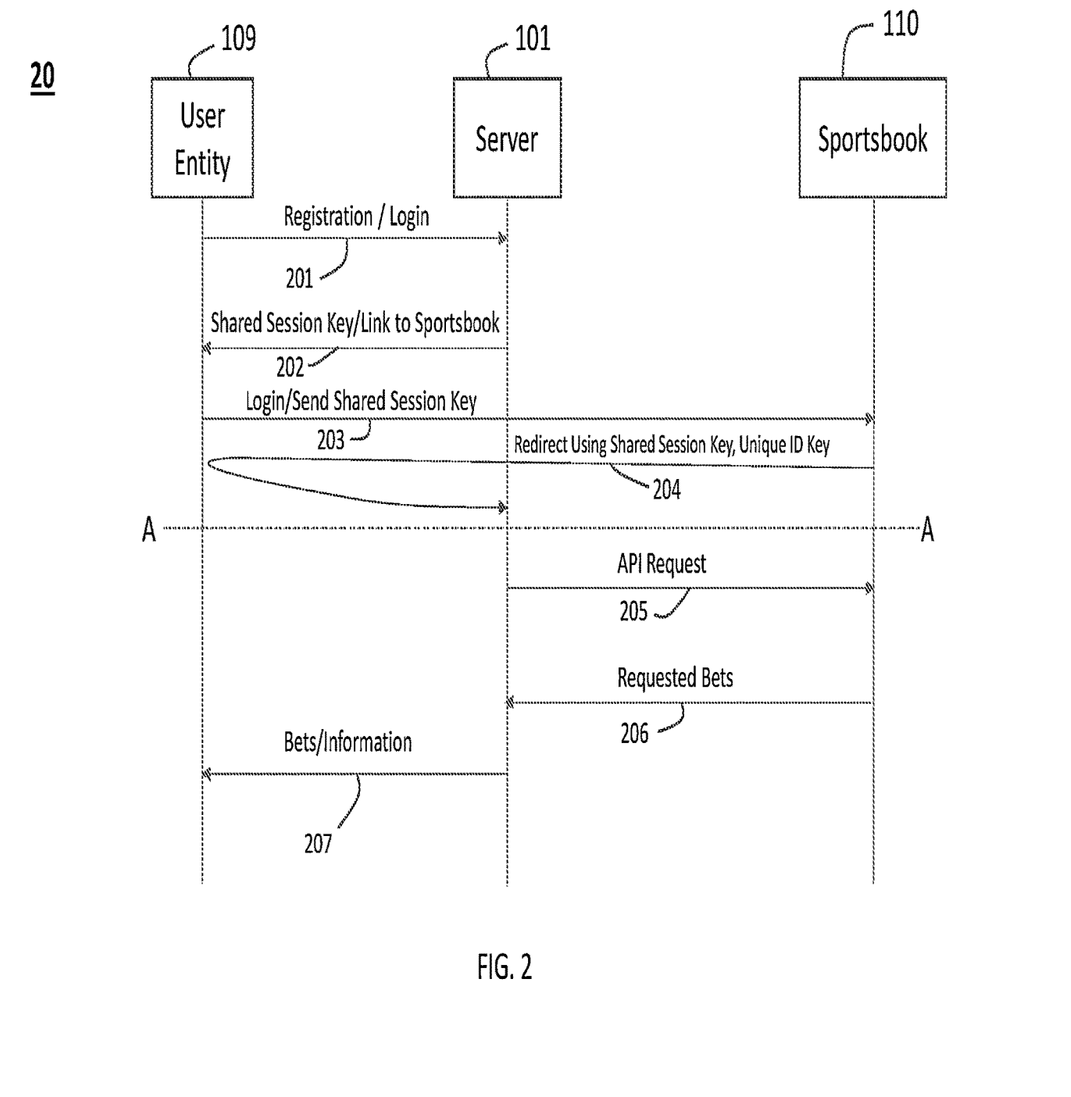
FIG. 2 illustrates a conceptual dataflow diagram according to an embodiment.
Figure 3A:
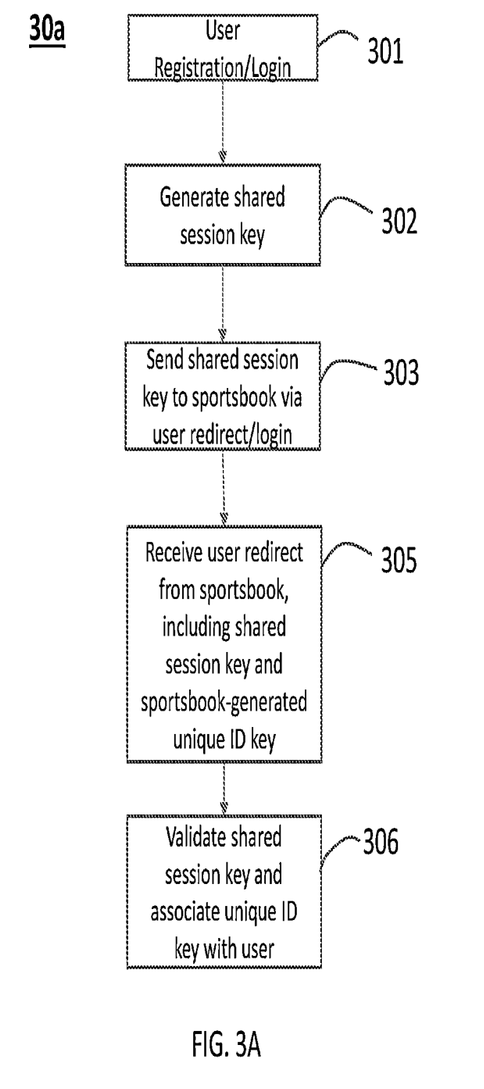
FIGS. 3A and 3B illustrate flowcharts according to an embodiment.
Figure 3B:
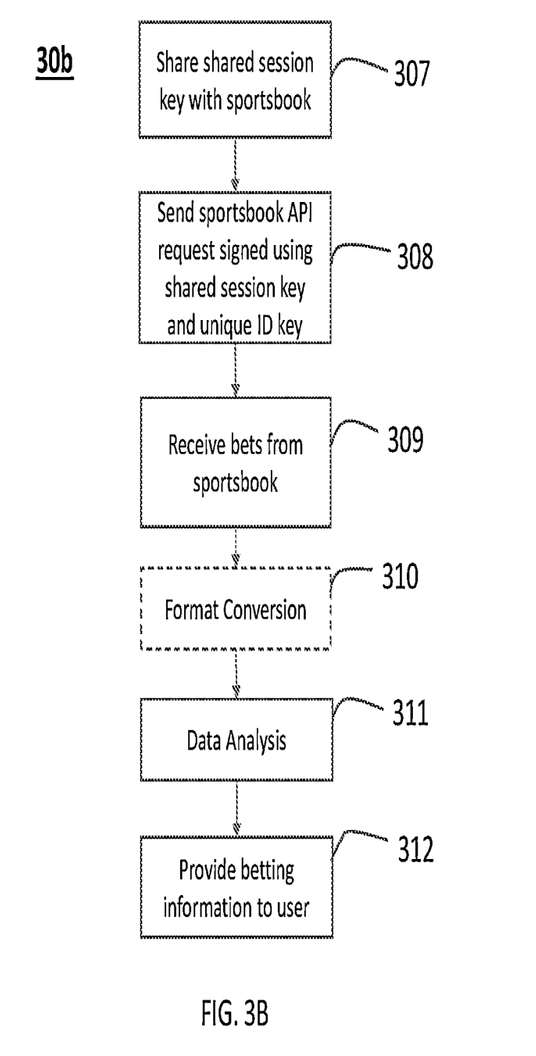
Figure 9:
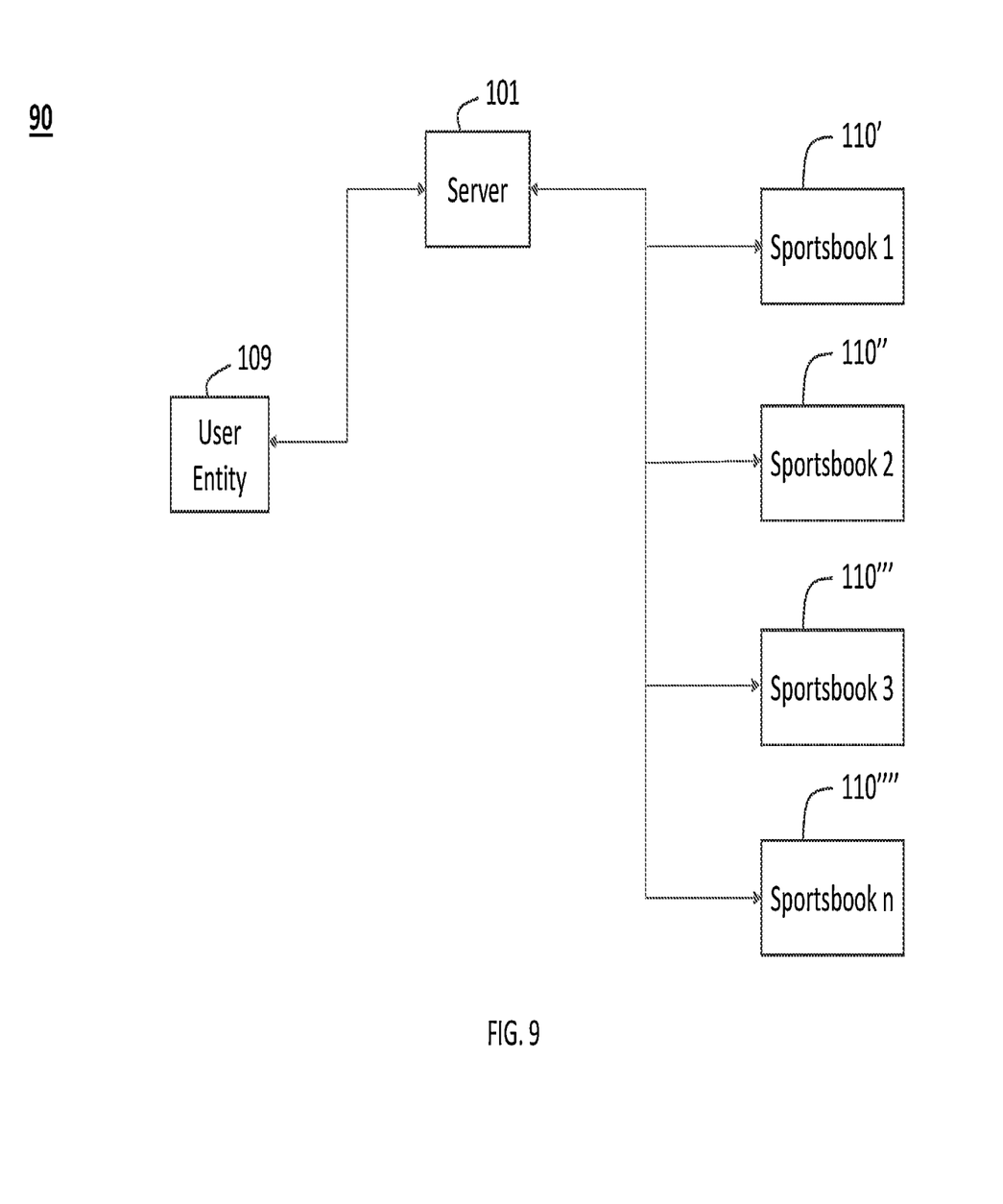
FIG. 9 illustrates a conceptual system and flowchart according to an embodiment.

FIG. 2 shows a conceptual dataflow diagram 20 according to an embodiment, and FIGS. 3A and 3B show conceptual flowcharts 30a and 30b according to an embodiment. As shown in FIG. 2, three different types of entities may be involved in processes according to an embodiment: a user entity 109, server 101, and one or more sportsbooks 110 such as depicted in FIG. 9. For example, data may flow among these entities, where server 101 may act as an intermediate point between the user entity 109 and the one or more sportsbooks 110. Although FIG. 2 depicts only one sportsbook 110, the methods and systems described herein may be used with one sportsbook (110'), two sportsbooks (110' and 110"), three sportsbooks (110', 110", 110'''), or any plurality of sportsbooks (110''') as illustrated by the system 90 at FIG. 9. According to an embodiment, the user entity 109 may represent bets from a single individual. According to an embodiment, the user entity 109 may represent bets from a group of individuals. The one or more sportsbooks 110 may be pre-registered with the server 101 to generate a shared session key, as explained in more detail below, for each of the one or more sportsbooks 110.

Figure 5A:
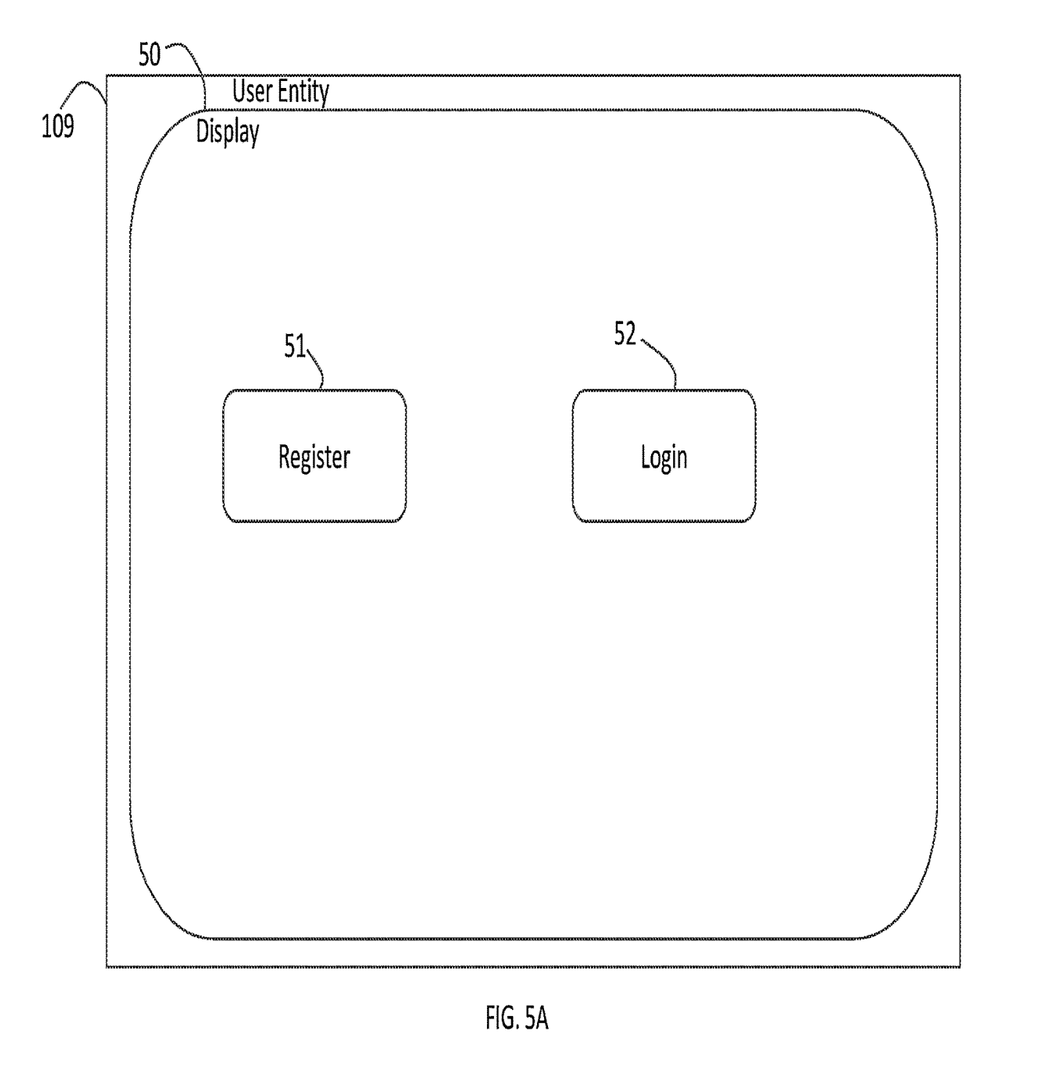
FIGS. 5A-5C illustrate a sequential user interface and display according to an embodiment.

According to an embodiment, a user entity 109 may register 301 with server 101. Alternatively, the user entity 109 may login 201 to the server 101, such as with previously authenticated login credentials, if the user entity 109 has previously registered with server 101 and has an existing account. As shown in FIG. 5A, a user of a user entity 109 having a display 50 may be shown the options to register 51 or login 52 and may select the appropriate option. For example, the selection may be performed by touch, if display 50 is a touchscreen display, or by use of pointing-and-clicking, e.g., using a mouse or stylus, or any other appropriate technique, based on the user entity 109 and the display 50. Upon user entity 109 registration/login, server 101 may generate a shared session key, as further described below.

According to an embodiment, the user entity 109 may provide server 101 with one or more sportsbooks 110 with which user entity 109 may place bets, for which user entity 109 would like server 101 to obtain the bets and synchronize. According to an embodiment, the one or more sportsbooks 110 may be identified and entered or registered during registration 301 of the user entity 109. For example, the user entity 109 may provide to the server 101 information on a sportsbook such as the name and website of the sportsbook 110. As explained above, the sportsbook 110 may be pre-registered with server 101 such that the sportsbook 110 need only be identified to the server 101 by the user entity 109. For example, the sportsbook 110 may be pre-registered by server 101 itself. As another example, the sportsbook 110 may be registered by a previous user entity such that the sportsbook 110 is pre-registered when the sportsbook 110 is identified and entered by user entity 109.

Figure 5B:
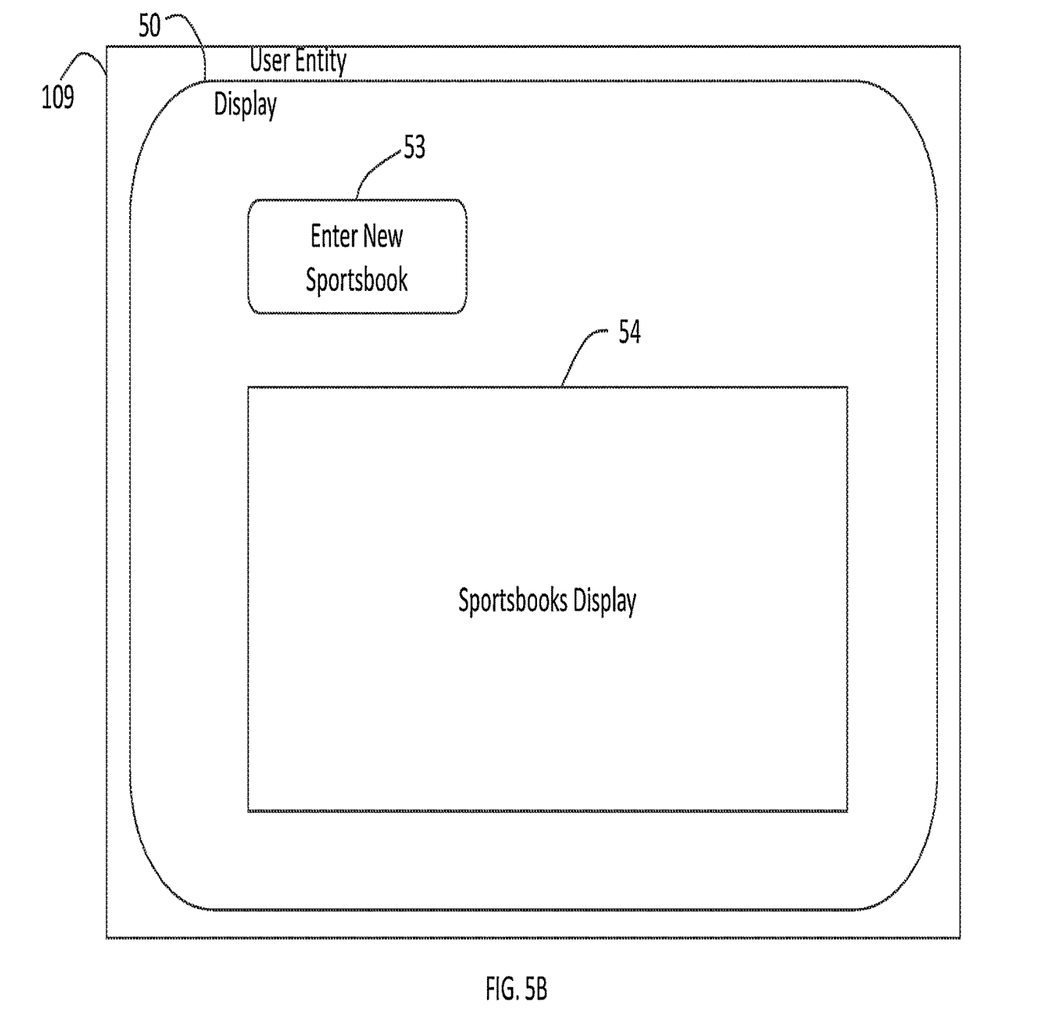
Figure 5C:
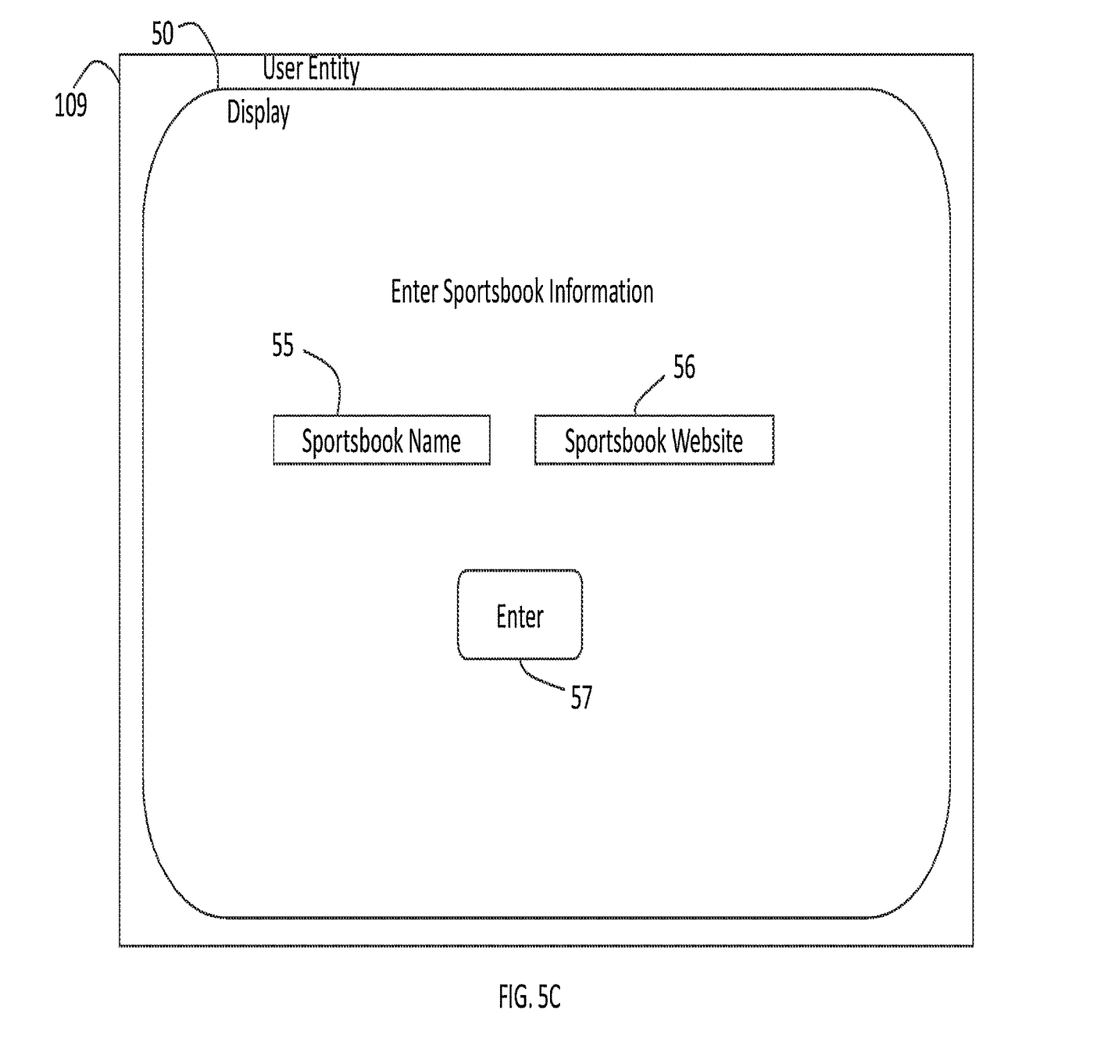

FIG. 5B shows an example user interface having a button 53 for the user to select to enter a new sportsbook 110 to server 101. Selecting button 53, for example, may result in a further user interface, e.g., as shown in FIG. 5C, that may permit the user to enter the name 55 and other information about a sportsbook 110, such as a website 56, after which the user may select "Enter" button 57. Entry may be via any appropriate input/output device or technique that may be appropriate to user entity 109. After selection of "Enter" 57, the display may revert to the display 50 as shown in FIG. 5B. A display 54 may show one or a plurality of sportsbooks 110 that the user has entered, including, if the user has just added a new sportsbook 110, the new sportsbook 110.

According to an embodiment, a unique shared session key may be generated for each of the plurality of sportsbooks that the user entity 109 enters or registers with server 101, as described above. According to an embodiment, the unique shared session key may be generated for each of the plurality of sportsbooks when they are registered or pre-registered with server 101, as described above, such as when each sportsbook 110 is registered by user entity 109 or the server 101. For example, the shared session key may be a shared application programming interface (API) key generated for sportsbook 110 to allow for secure and/or encrypted communications between the server 101 and the sportsbook 110. According to an embodiment, the shared API key may be signed token using a private key or public/private keys encryption scheme, such as, for example, a JavaScript® Object Notation Web Token (JWT), an authentication token, or other type of authentication key to authenticate the sportsbook 110 to securely interact or access the server 101. According to an embodiment, the shared session key may be used for communications between the sportsbook 110 and the server 101 for the user entity 109 and any other user entity that identifies and enters the sportsbook 110. According to an embodiment, the shared session key may be used for all communications between the sportsbook 110 and the server 101 relating to any user entity or a plurality of user entities. For example, a different shared session key need not be generated when a user entity identifies or enters the sportsbook 110 that has already been previously identified or entered, and registered, by another user entity or server 101.

According to an embodiment, the shared session key for the sportsbook 110 may be generated with a time-to-live (TTL) or expiration when the sportsbook 110 is registered by the user entity 109, a previous user entity, or the server 101. For example, the TTL or expiration of the shared session key may be set to a predetermined amount of time such as, but not limited to, a predetermined number of days (e.g., such as 1-day), a predetermined number of weeks (e.g., such as 1-week), a predetermined number of months (e.g., such as 1-month), or a predetermined number of years (e.g., such as 1-year). According to an embodiment, the TTL or expiration of the shared session key may be set to a predetermined number of uses, such as a predetermined number of times the sportsbook 110 accesses the server 101. Upon expiration of the TTL, the shared session key may be renewed upon a user entity login or other entry to access the corresponding sportsbook 110.

After the user entity 109 provides the information of the one or more sportsbooks 110 to server 101 and a unique shared session key is generated or was previously generated for the corresponding sportsbook 110, the shared session key may be sent to the user entity 109. According to an embodiment, the shared session key may be incorporated into a link to sportsbook 110, which may be sent 202 from the server 101 to user entity 109. For example, the link to the sportsbook 110 may appear on an application or website through which the user entity 109 accesses server 101. As described above, a unique shared session key may be generated for each sportsbook 110 entered by the user entity 109 into the server 101, and the links to the different sportsbooks 110 will each incorporate the unique shared session key for the corresponding sportsbook 110. Similarly, if the unique shared session key was previously generated for each sportsbook 110 entered by the user entity 109 into the server 101, the links to the different sportsbooks 110 will each incorporate the unique shared session key for the corresponding sportsbook 110.

Figure 6:
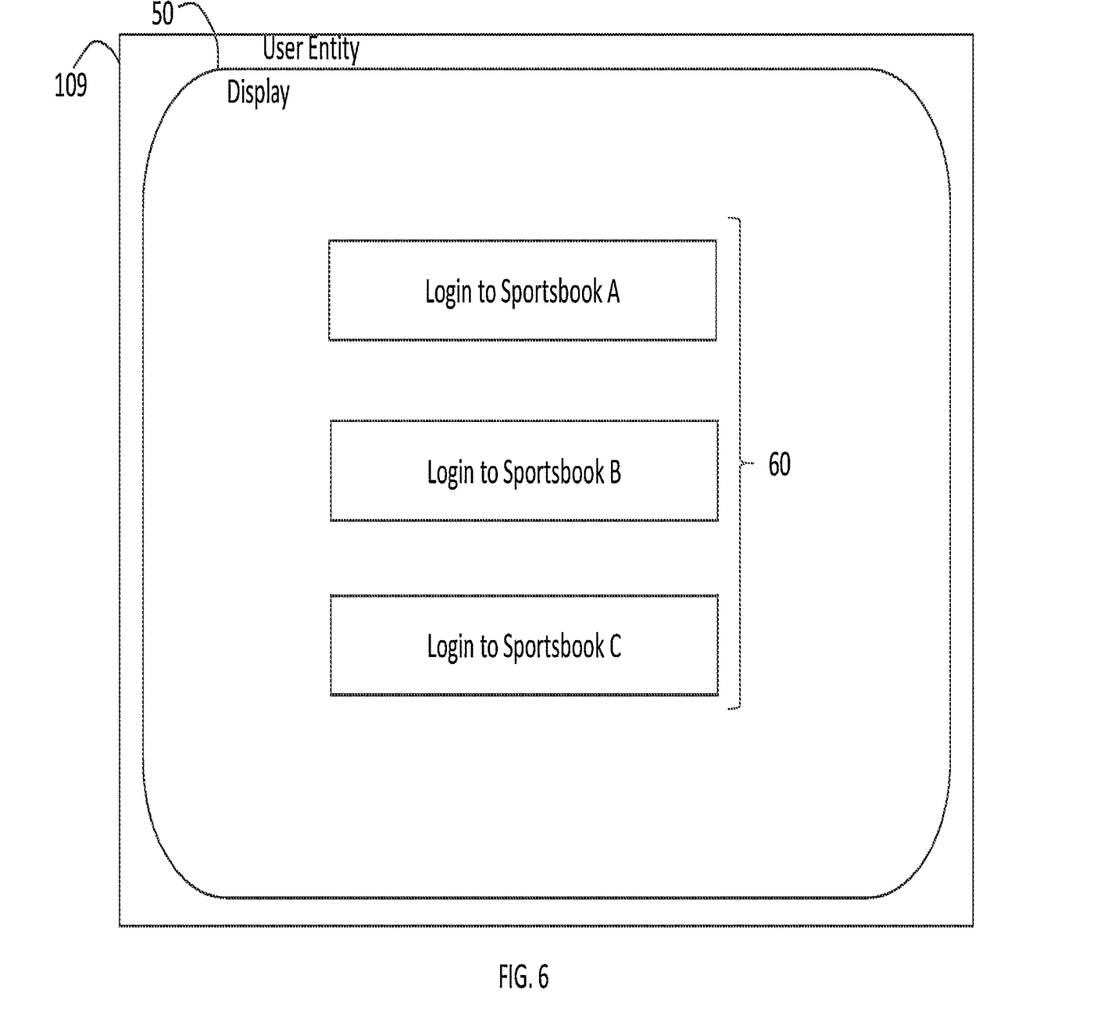
FIG. 6 illustrates a user interface and sportsbook login display according to an embodiment.

A non-limiting example of links to one or more sportsbooks provided to the user entity 109 from the server 101 is shown in FIG. 6, where display 50 of user entity 109 may include one or more buttons 60 that may represent one or more of these links, received from server 101, to one or more sportsbooks 110. The link on user entity 109 may allow the user to login to the user's account with sportsbook 110 (such as by the user providing the appropriate login credentials for the user account to login to the sportsbook 110) and, in the process, forward the shared session key 203 to sportsbook 110.

Sportsbook 110 may then associate the shared session key with the user account at sportsbook 110. According to an embodiment, a unique reference identification key may be generated by the sportsbook 110 to associate the user account with the shared session key. According to an embodiment, the unique reference identification key may alternatively be generated by server 101 when the user entity 109 enters or registers the sportsbook 110 with the server 101, as described above, and/or when the user entity 109 logs in to the sportsbook 110 via server 101. The unique reference identification key generated by the server 101 may be sent to the corresponding sportsbook 110 during the registration or login process. According to an embodiment, the unique reference identification key may have a TTL or expiration that is less than the TTL or expiration of the shared session key. For example, the TTL or expiration of the unique reference identification key may be set to a predetermined amount of time such as, but not limited to, a predetermined number of seconds (e.g., such as 3600-second), a predetermined number of minutes (e.g., such as 60-minutes), a predetermined number of hours (e.g., such as 2-hours), or a predetermined number of days (e.g., such as 7-days). According to an embodiment, the TTL or expiration of the unique reference identification key may be set to a predetermined number of uses, such as a predetermined number of times the sportsbook 110 accesses the server 101 (e.g., 1-time use). For example, the TTL of the shared session key may be 1-year and the TTL of the unique reference identification key may be 2-hours. According to an embodiment, the unique reference identification key may be unique to the user entity 109 for communications with a particular sportsbook. For example, for sportsbook 110, a different unique reference identification key may be generated for each user entity that logs in to the sportsbook 110 via the server 101. For example, for user entity 109, a different unique reference identification key may be generated for each sportsbook 110 that user entity 109 logs in to via the server 101.

After the login to the user's account with sportsbook 110 is completed and after the sportsbook 110 accepts linking terms of agreement, the user entity 109 may then be redirected 204, 305 by sportsbook 110 to server 101, and the redirect may include providing the unique reference identification key (whether generated by the sportsbook 110 or by the server 101) and the shared session key to server 101. Server 101 may then validate the shared session key in the redirect, such as by an algorithm-based validation known to one of ordinary skill in the art, and associate the unique reference identification key with the user entity 109. As a result, both server 101 and sportsbook 110 may have the shared session key and the unique reference identification key associated with user entity 109, and the shared session key and the unique reference identification key may then be used for subsequent signing and validation for secure communication between server 101 and sportsbooks 110 relating to the account of user entity 109. This concludes the operations shown in FIG. 2, above line A-A, and in FIG. 3A.

Reference is now made to FIG. 2, below line A-A, and FIG. 3B. These aspects of the disclosure address downloading of betting information from one or more sportsbooks 110 to server 101, after the preliminary process (FIG. 2, above line A-A, and FIG. 3A) has been performed such as registration and login. The flowchart 30b of FIG. 3B considers a scenario in which the shared session key for the particular user entity 109, for example, is first sent 307 to sportsbook 110. Server 101 may then send 205, 308 a request for the user entity's betting information from the sportsbook 110 using the secure communications channel described above. According to an embodiment, the request is sent directly from server 101 to the one or more sportsbooks 110. According to an embodiment, the request may be performed using the secure communication channels, as described above, such as through an application programming interface (API) of sportsbook 110 which may be in the form of a JavaScript® Object Notation Web Token (JWT). The request may include a timestamp generated by server 101, which may indicate a start date/time for which betting information is being requested (which may correspond to a previous time at which the user entity's bets with this sportsbook 110 were downloaded/synchronized). This request may be digitally signed using the shared session key for the user, as well as the unique reference identification key for the user, and the digital signing may take the form of using the two keys to hash or otherwise encrypt the request message. At the sportsbook 110, the message may be validated (by hashing or decryption, using the two keys) and processed to determine what betting information is being requested (e.g., but not limited to, from what date/time betting information is being requested for the user entity 109; as further examples, the request may also specify types of bets, types of events, or the like, as may be specified by preferences received from user entity 109), as described in further detail below. Server 101 may then receive 206, 309 the betting information requested for user entity 109, which may be hashed/signed using the shared session key and/or the unique reference identification key. According to an embodiment, the betting information received by server 101 may already be provided in an agreed-upon format known by sportsbook 110 to be used by server 101. If not, however, server 101 may convert 310 the downloaded betting information into a standard format used by server 101 and may store the user's betting information in memory 103 (in one or both of downloaded format or standard format). Server 101 may perform data analytics 311 on the betting information, as described in more detail below. Given that the processes shown in FIGS. 2, 3A and 3B (through 310) may be performed for multiple sportsbooks 110 for a given user entity 109, the data analytics may be performed 311 on betting information received from one or a plurality of sportsbooks 110. For example, betting information for one user entity 109 may be obtained from a plurality of sportsbooks 110.

Figure 4:
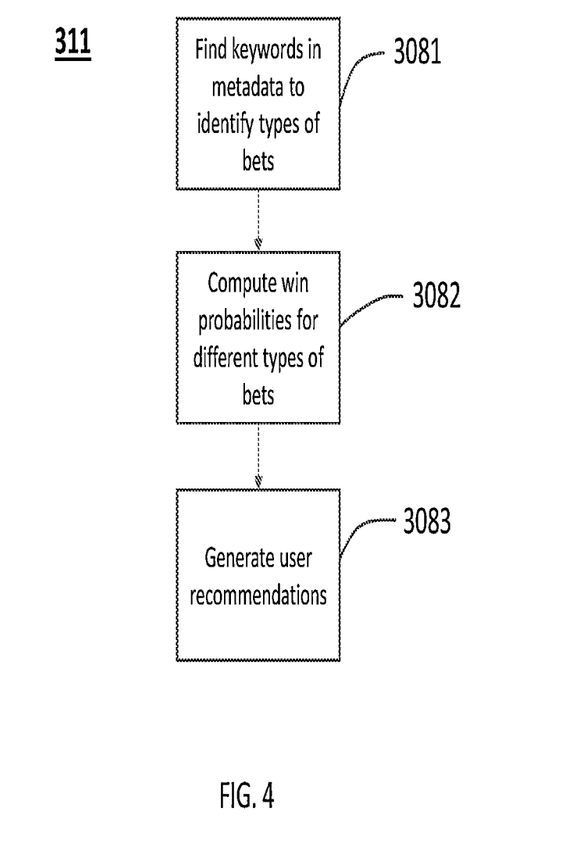
FIG. 4 illustrates a flowchart according to an embodiment.

FIG. 4 provides an example flowchart of performing data analytics 308, according to an aspect of this disclosure. According to an embodiment, processor(s) 102 of server 101 may perform data analytics on the betting information, as described below. According to an embodiment, a processor of the user entity 109 may perform data analytics on the betting information. For example, the processor may use metadata 3081 from the betting information to detect different types of bets made by the user entity 109. This may be done by parsing and detecting keywords in the betting information and/or the metadata. For example, the metadata may include the following string:

Dallas Cowboys @ Philadelphia Eagles–Dallas Cowboys+1.50

The processor may parse the string to detect keywords to identify teams. The identified teams may be grouped as a keyword cluster to identify the game. If a date or time (e.g., a game time) is detected in the string, the processor may use the keyword cluster and the time to determine a specific game. For example, the keyword cluster and the time may be used to identify the first available game in the future that matches the keyword cluster (e.g., the teams) and the time (e.g., the game time). For example, the processor may compare the keyword cluster and the time parsed from the string with a stored schedule of games to identify subject game of the string.

The processor may further parse the string for patterns that identify a bet type. As an example, if the string includes the term "+1.5", the processor may identify the bet as a spread bet on the team that is not favored to win. As a further example, if the string includes the term "+900 to win Superbowl", the processor may identify the bet type as a future bet. As a further example, if the string includes the term "−120 outright", the processor may identify the bet type as a money line bet. As a further example, if the string includes the term "over" or "under", the processor may identify the bet type as a "total"-type bet. For example, the processor may compare the parsed patterns from the string with a stored set of patterns to identify subject bet type of the string.

According to an embodiment, win probabilities for the different types of bets made by the user entity 109 may be computed 3082 by the processor. The win probabilities may be computed by the processor, e.g., based on a running basis (e.g., wins to that point on a type of bet/total number of the type of bet to that point), based on a time window, etc., but the invention is not limited to any particular way of computing win probabilities. An overall win probability may also be computed by the processor (e.g., total wins on all bets/total bets of all types). Betting recommendations may then be generated 3083 by the processor, based at least in part on the win probabilities.

As an example, a single user may have placed bets with a plurality of different sportsbooks on over/under lines, on winners and losers against a point spread (to clarify, what is meant by this is whether the favored team/participant in the sporting event beats the point spread or not, and the bet is on whether the favored team/participant will or will not win by more than the point spread (or similarly, whether the non-favored team will either win or lose by less than the point spread)), win, place, and/or show in a sporting event such as a horse race, etc. According to an embodiment, the analytics computed by the processor may show that the user has been most successful in choosing winners and losers against a point spread, or even that the user is most successful in choosing winners against a point spread, rather than losers, or any other types of bets that the user has made. In conjunction with this, the user may be presented with the associated win (referring to her bets) probabilities of the different types of bets, or at least of the user's most successful type of bet(s).

Figure 7:
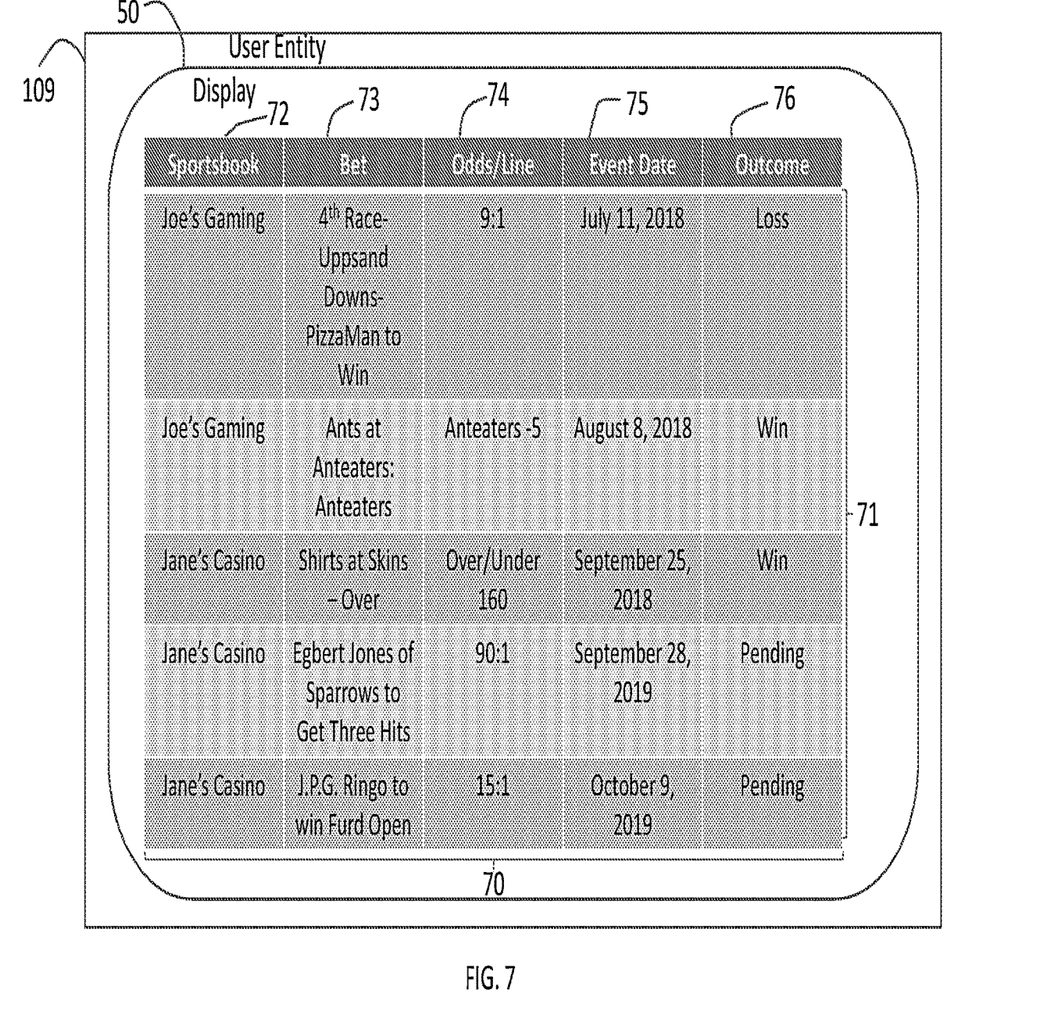
FIG. 7 illustrates a user interface and display of bet information according to an embodiment.

Returning to FIGS. 2 and 3, the user entity 109 may, for example, but is not limited to, display the user's bets, such as in tabular form 70 or other form on display 50, as shown in FIG. 7. According to an embodiment, server 101 may provide 207, 312 to the user entity 109 the bets associated with the user entity 109 after obtaining bets 206, 3309 and performing analytics 311 on the betting information for the user entity 109. In the example of FIG. 7, the table 70 may include multiple columns 72-76, with a row for each of the user's bets 71. In this example, to which the invention is not limited, each row may include a name 72 of a sportsbook 110 through which the bet was placed and the betting information retrieved, the bet made 73, the odds or betting line 74 associated with the bet, the date of the event 75 on which the bet was made, and the outcome 76 of the bet. In this fashion, a user entity 109 may be able to easily and securely track the bets made on different sportsbooks. Additionally, either automatically, together with the bets (which may be a user-selectable option), or separately from the bets (which may be in response to further user input/selection, following download of the bets), information based on the analytics performed 311 may be provided 207, 312. This information may include, for example, win probabilities and/or recommendations and/or other information about the bets made by the user entity 109. Bets and/or other information may be presented in a display 50 of the user entity 109, which display 50 may be within an application or web-site associated with server 101.

Figure 8:
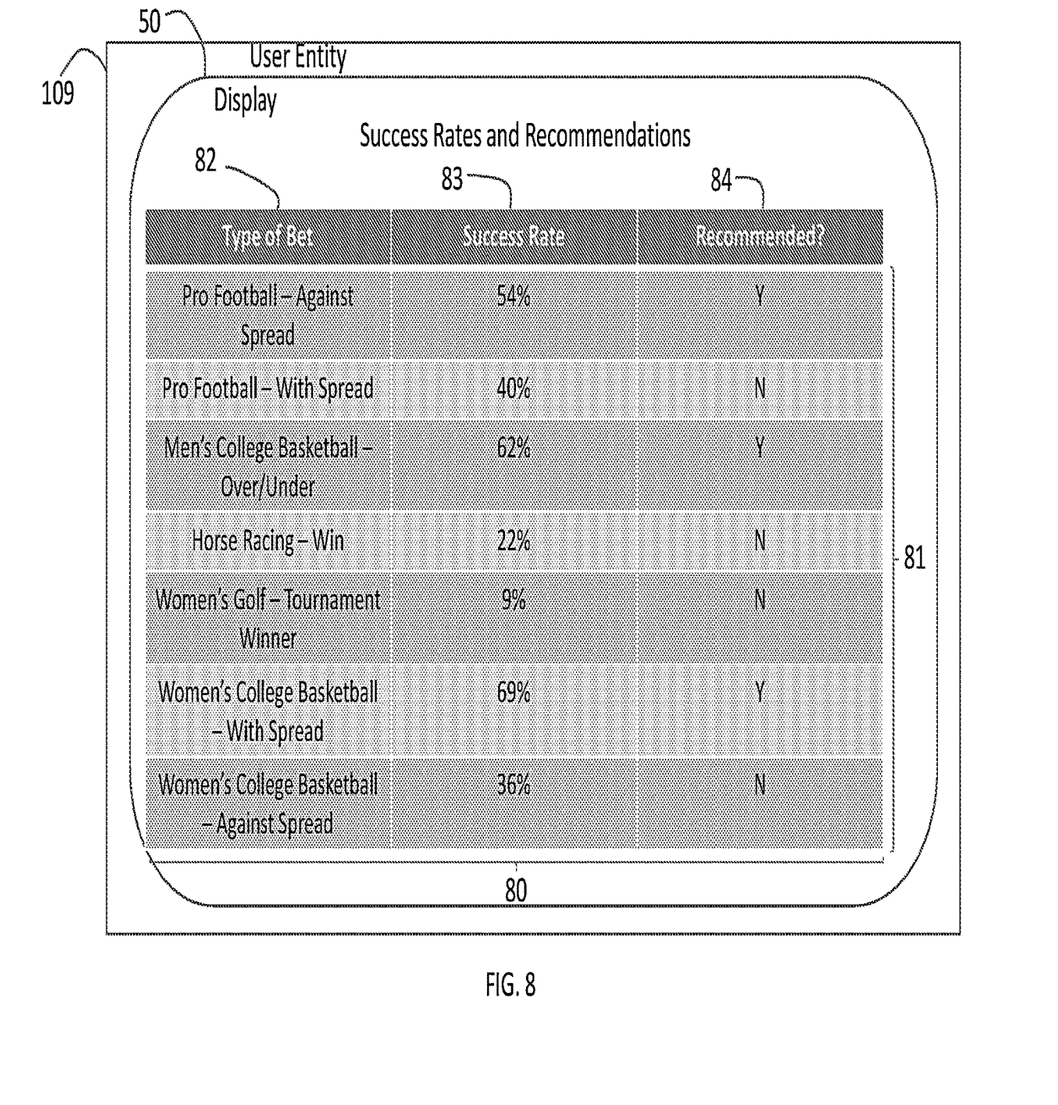
FIG. 8 illustrates a user interface and display of Success Rates and Recommendations according to an embodiment.

FIG. 8 shows a non-limiting example of a display 50, in tabular form 80, to which the invention is not limited. The table 80 may show, for example, different types of bets 82 made by the user, the success (win) rates 83 of the different types of bets, and recommendations 84 determined by the processor of whether or not to make the different types of bets 82 in the future, which may be based on the user's success rates 83 for the bets. Success rates 83 may be displayed in the form of percentages or probabilities, for example. According to an embodiment, the table 80 may further include a column indicating how many times the user has made a given type of bet 82. According to an embodiment, a type of bet may be recommended if the success rate 83 for that type of bet exceeds a minimum threshold value (for example, but not limited to, 50%). According to an embodiment, the recommendation 84 may be based on both volume (number of times the type of bet 82 has been made) and on success rate 83; for example, a recommendation for the user to make a particular type of bet 82 may require the user to have made a predetermined minimum number of such bets 82 in the past, as well as a minimum success rate 83, to ensure that the success rate 83 is statistically significant. That is, in some implementations, the processor may determine no recommendation 84 may be shown if the user has not made a sufficient number of a given type of bet 82, which number may be a predetermined number, which may be set by (an operator of) server 101 or may be set according to some statistical or other algorithm.

According to some aspects of the present disclosure, providing the API request 205 and downloading user bets 206, 309 from a sportsbook 110 may be performed by the server 101 on a recurring basis in a polling-based downloading system. That is, for a given user, server 101 may poll the various sportsbooks 110 with which the user has made bets in the past to see if there is any new betting information to download. Such recurrence may be periodic, at predetermined intervals of time (e.g., daily, weekly, etc.), or it may be in response to user prompting, or both.

According to a further aspect of the present disclosure, rather than having the polling-based downloading system, a socket-type connection may be established with the various sportsbooks 110, such as, for example, a secure HTTPS connection or a network TCP socket connection to facilitate server-to-server communications, and information regarding user bets made at the various sportsbooks 110 may be downloaded continuously, such as in real-time (e.g., as bets are being made and/or settled).

In either of these cases, the information obtained may be used to update the information shown in FIG. 7 and/or FIG. 8.

According to an embodiment, once the user has registered with server 101 and the respective unique reference identification key of the user is available to server 101 for each sportsbook 110 with which the user places bets (or a socket has been established with the sportsbook 110), the user may use the secure connection to make bets with the different sportsbooks 110 for which the server 101 has such a unique reference identification key (or socket) for that user, by using the server 101 as a conduit. In this manner, the server 101 may record the user's bets as they are placed and update the outcomes as they are determined, eliminating the need to download this information.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. For example, it will be understood that embodiments of the invention may be made from a variety of different materials.

The invention claimed is:

1. A method, comprising:
incorporating, via at least one processor of a server, a shared session key into a link on a website, the link directing a user interface to a sportsbook, wherein the link enables a user to login to the sportsbook;
receiving, at the server after the user has logged in, via a user redirect to the server from the sportsbook, a unique reference identification key generated by the sportsbook, wherein the unique reference identification key is associated with the user;
transmitting, by the server, a request to the sportsbook for information associated with the user, wherein the request is signed using the shared session key and the unique reference identification key; and
receiving, at the server, the information associated with the user from the sportsbook.

2. The method of claim 1, wherein:
the information associated with the user comprises bets of the user; and
the method further comprises displaying the bets of the user on a display associated with the user.

3. The method of claim 1, wherein the sportsbook comprises a plurality of sportsbooks, and wherein receiving the information associated with the user comprises receiving betting data associated with the user from the plurality of sportsbooks.

4. The method of claim 3, further comprising:
providing the betting data from the plurality of sportsbooks to the user.

5. The method of claim 4, further comprising:
performing data analysis on the betting data from the plurality of sportsbooks; and
displaying one or more results of the data analysis on a display of the user.

6. The method of claim 5, wherein:
the data analysis includes analyzing betting performance of the user in different types of bets; and
the displaying the one or more results of the data analysis includes displaying one or more betting type recommendations to the user.

7. The method of claim 1, wherein the shared session key is valid for a predetermined amount of time.

8. The method of claim 1, further comprising:
identifying, via the at least one processor, different types of bets made by the user by detecting keywords in metadata of the information associated with the user;
performing, via the at least one processor, data analysis on the different types of bets made; and
providing the data analysis to the user.

9. The method of claim 1, wherein the request is signed via at least one of hashing or encryption using at least one of the shared session key and the unique reference identification key.

10. The method of claim 1, wherein the transmitting of the request is performed using an application programming interface (API) of the sportsbook.

11. A server, comprising:
one or more processors;
non-transitory memory communicatively coupled to the one or more processors; and
a communication system coupled to the one or more processors,
wherein the non-transitory memory contains instructions which, when executed by the one or more processors, cause the one or more processors to perform operations including:
　incorporating, via the one or more processors, a shared session key into a link on a website, the link directing user interface to a sportsbook, wherein the link enables a user to login to the sportsbook;
　receiving, at the server after the user has logged in, via a user redirect to the server from the sportsbook, a unique reference identification key generated by the sportsbook, wherein the unique reference identification key is associated with the user;
　transmitting, by the server, a request to the sportsbook for information associated with the user, wherein the request is signed using the shared session key and the unique reference identification key; and
　receiving, at the server, the information associated with the user from the sportsbook.

12. The server of claim 11, wherein:
the information associated with the user comprises bets of the user; and
the non-transitory memory contains additional instructions which, when executed by the one or more processors, cause the one or more processors to perform operations comprising:
　displaying the bets of the user on a display associated with the user.

13. The server of claim 11, wherein the sportsbook comprises a plurality of sportsbooks, and wherein receiving the information associated with the user comprises receiving betting data associated with the user from the plurality of sportsbooks.

14. The server of claim 13, wherein the non-transitory memory contains additional instructions which, when executed by the one or more processors, cause the one or more processors to perform operations comprising:
　providing the betting data from the plurality of sportsbooks to the user.

15. The server of claim 14, the non-transitory memory contains additional instructions which, when executed by the one or more processors, cause the one or more processors to perform operations comprising:
　performing data analysis on the betting data from the plurality of sportsbooks; and
　displaying one or more results of the data analysis on a display of the user.

16. The server of claim 15, wherein:
the data analysis includes analyzing betting performance of the user in different types of bets; and
the displaying the one or more results of the data analysis includes displaying one or more betting type recommendations to the user.

17. The server of claim 11, wherein the shared session key is valid for a predetermined amount of time.

18. The server of claim 11, the non-transitory memory contains additional instructions which, when executed by the one or more processors, cause the one or more processors to perform operations comprising:
　identifying, via the one or more processors, different types of bets made by the user by detecting keywords in metadata of the information associated with the user;
　performing, via the one or more processors, data analysis on the different types of bets made; and
　providing the data analysis to the user.

19. The server of claim 11, wherein the request is signed via at least one of hashing or encryption using at least one of the shared session key and the unique reference identification key.

20. A non-transitory computer-readable storage medium having instructions stored which, when executed by at least one processor of a server, cause the at least one processor to perform operations comprising:
　incorporating, via at least one processor, a shared session key into a link on a website, the link directing a user interface to a sportsbook, wherein the link enables a user to login to the sportsbook;
　receiving, at the server after the user has logged in, via a user redirect to the server from the sportsbook, a unique reference identification key generated by the sportsbook, wherein the unique reference identification key is associated with the user;
　transmitting, by the server, a request to the sportsbook for information associated with the user, wherein the request is signed using the shared session key and the unique reference identification key; and
　receiving, at the server, the information associated with the user from the sportsbook.

\* \* \* \* \*